United States Patent
Ladkat et al.

(10) Patent No.: US 9,328,292 B2
(45) Date of Patent: May 3, 2016

(54) METHOD AND DEVICE FOR IMPROVING EFFICIENCY OF SPONGE OIL ABSORPTION

(71) Applicant: UOP LLC, Des Plaines, IL (US)

(72) Inventors: Kiran Ladkat, Gurgaon (IN); Neeraj Tiwari, Gurgaon (IN)

(73) Assignee: UOP LLC, Des Plaines, IL (US)

( * ) Notice: Subject to any disclaimer, the term of this patent is extended or adjusted under 35 U.S.C. 154(b) by 161 days.

(21) Appl. No.: 13/974,365

(22) Filed: Aug. 23, 2013

(65) Prior Publication Data

US 2015/0053590 A1 Feb. 26, 2015

(51) Int. Cl.
*C10G 5/04* (2006.01)
*C01B 3/52* (2006.01)

(52) U.S. Cl.
CPC ... *C10G 5/04* (2013.01); *C01B 3/52* (2013.01); *C01B 2203/0415* (2013.01); *C10G 2400/26* (2013.01)

(58) Field of Classification Search
CPC ........ C10G 5/04; C10G 2400/26; C01B 3/52; C01B 2203/0415; B01D 53/14
USPC ............................ 95/149, 234; 55/346; 96/234
See application file for complete search history.

(56) References Cited

U.S. PATENT DOCUMENTS

| | | | |
|---|---|---|---|
| 3,907,524 A * | 9/1975 | Haines, Jr. | ......... B01D 53/1487 95/192 |
| 4,822,480 A | 4/1989 | Harandi et al. | |
| 4,973,790 A | 11/1990 | Beech, Jr. et al. | |
| 6,190,536 B1 | 2/2001 | Lokhandwala et al. | |
| 6,379,533 B1 | 4/2002 | Thakkar et al. | |
| 6,740,230 B1 | 5/2004 | Hugo et al. | |
| 6,852,144 B1 | 2/2005 | Wagner et al. | |
| 8,198,492 B2 | 6/2012 | Brady et al. | |
| 8,283,506 B2 | 10/2012 | Kokayeff et al. | |
| 8,314,274 B2 | 11/2012 | Marker et al. | |
| 2005/0072300 A1 | 4/2005 | Linga et al. | |
| 2006/0057056 A1 | 3/2006 | Chretien | |
| 2008/0290719 A1 | 11/2008 | Kaminsky et al. | |

(Continued)

FOREIGN PATENT DOCUMENTS

EP 0 227 259 7/1987
WO WO 2012/016063 A1 1/2013

OTHER PUBLICATIONS

Sukanandan et al.; Value addition from CFU by optimization of stripper parameters; Energy Institute—19th World Petroleum . . . ; vol. 2 2008 p. 944.

(Continued)

*Primary Examiner* — Randy Boyer
*Assistant Examiner* — Juan Valencia
(74) *Attorney, Agent, or Firm* — James C. Paschall

(57) ABSTRACT

A method for improving efficiency of sponge absorption includes providing cold flash drum liquid to an inlet of a cold stripper to produce a cold stripper net overhead vapor stream rich in liquid petroleum gas, and separately providing hot flash drum liquid to an inlet of a hot stripper to produce a hot stripper net overhead vapor stream rich in hydrogen. The cold stripper net overhead vapor stream and the hot stripper net overhead vapor stream are separately routed to a sponge absorber to recover a liquid petroleum gas output stream using sponge oil. In particular, the cold stripper net overhead vapor stream and the hot stripper net overhead vapor stream are separately routed to the sponge absorber at different tray locations.

6 Claims, 3 Drawing Sheets

(56) References Cited

U.S. PATENT DOCUMENTS

| | | |
|---|---|---|
| 2010/0137662 A1 | 6/2010 | Sechrist et al. |
| 2010/0155295 A1 | 6/2010 | Hedrick et al. |
| 2011/0108457 A1* | 5/2011 | Da Silva Ferreira Alves ............. C10G 7/00 208/70 |

OTHER PUBLICATIONS

Xu et al.; Technical transform of LPG sweetening unit; Petroleum Processing and and Petrochemcials; vol. 32, Issue 8, Aug. 2001; pp. 25-27.

Lawson; UltraLean [trademark] amine, zero residual acid gas loading; GPA Annual convention Proceedings 2001.

Laux et al.; Environmental control and energy conservation. Sulfur Plant Operations. Amine Plants; Ntl. Perochemcial and . . . ; vol. 1990-1999; 2000.

Duguid; Avoid process engineering mistakes; Chemical Engineering vol. 108, Issue 12; Nov. 2001.

Bullin et al.; Design considerations for sweetening LPG's with amines; Proceedings Annual Convention . . . ; GPA 74th Ann. Convention; Mar. 13, 1995.

Eastham et al.; Advances in tower packing design; Chemical Engineering Progress, vol. 74, Issue 4; Apr. 1978.

Nelson et al.; A Modified Methanol Recovery System Removes H2S . . . ; 31st Gas Conditioning Ann. Conf.; J. V79, No. 30; 183-186; Jul. 27, 1981.

* cited by examiner

METHOD AND DEVICE FOR IMPROVING EFFICIENCY OF SPONGE OIL ABSORPTION

BACKGROUND OF THE INVENTION

In conventional liquid petroleum gas (LPG) recovery maximization flow schemes in the hydrocracking technology, a large amount of sponge oil is required relative to the level of LPG recovered. In conventional LPG recovery process with a single stripper design or with a two stripper design (where hot stripper vapor may be fed to the cold stripper), a combined net overhead vapor from the one or more strippers is routed to a sponge absorber through an amine scrubber. However, the hydrogen content of the combined overhead vapor makes absorption of the LPG difficult.

Accordingly, there is a need for a method to more efficiently absorb LPG from the hot stripper and cold stripper net overhead vapors.

SUMMARY OF THE INVENTION

A first aspect of the invention is a method for improving efficiency of sponge absorption which includes providing cold flash drum liquid to an inlet of a cold stripper to produce a cold stripper net overhead vapor stream, and separately providing hot flash drum liquid to an inlet of a hot stripper to produce a hot stripper net overhead vapor stream. The cold stripper net overhead vapor and the hot stripper net overhead vapor are separately routed to a sponge absorber to recover a liquid petroleum gas output stream.

Another aspect of the invention is a sponge oil absorbing device that includes a cold stripper and a hot stripper. The cold stripper receives a feed from a cold flash drum and non-condensable vapor is separated from the cold stripper receiver. Similarly, the hot stripper receives a feed from a hot flash drum and non-condensable vapor gets separated from the hot stripper receiver. A sponge absorber receives first and second net overhead vapor feed streams at different feed tray locations. The first feed is the cold stripper net overhead vapor from the cold stripper, and the second feed is the hot stripper net overhead vapor from the hot stripper. The cold stripper net overhead vapor and the hot stripper net overhead vapor are separately routed to the sponge absorber at different tray locations.

Still another aspect of the invention is a method for improving efficiency of sponge absorption including providing cold flash drum liquid to an inlet of a cold stripper to produce a cold stripper net overhead vapor stream rich in liquid petroleum gas, and separately providing hot flash drum liquid to an inlet of a hot stripper to produce a hot stripper net overhead vapor stream rich in hydrogen. The cold stripper net overhead vapor stream is routed to a first amine scrubber, and the hot stripper net overhead vapor stream is separately routed to a second amine scrubber separate from the first amine scrubber.

DETAILED DESCRIPTION OF THE INVENTION

Based on various studies performed, it has been found that the presence of hydrogen in stripper net overhead vapor provided to a sponge absorber reduces the sponge absorber efficiency and requires large amount of sponge oil for absorption. Higher concentrations of hydrogen in the net overhead vapor stream result in higher sponge oil requirements for the desired LPG recovery.

When comparing the composition of cold flash drum liquid and hot flash drum liquid, the ratio of LPG and hydrogen in the cold flash drum liquid and hot flash drum liquid varies significantly. In particular, of the total LPG present in both the cold flash drum and hot flash drum liquid stream, about 70-90% of the LPG is present in the cold flash drum liquid, while only about 10-30% is present in the hot flash drum liquid. Conversely, of the hydrogen present in the combined feed (i.e. cold flash drum liquid and hot flash drum liquid) about 20-35% of the hydrogen is present in the cold flash drum liquid, and about 65-80% is contained in the hot flash drum liquid.

Figure 1:
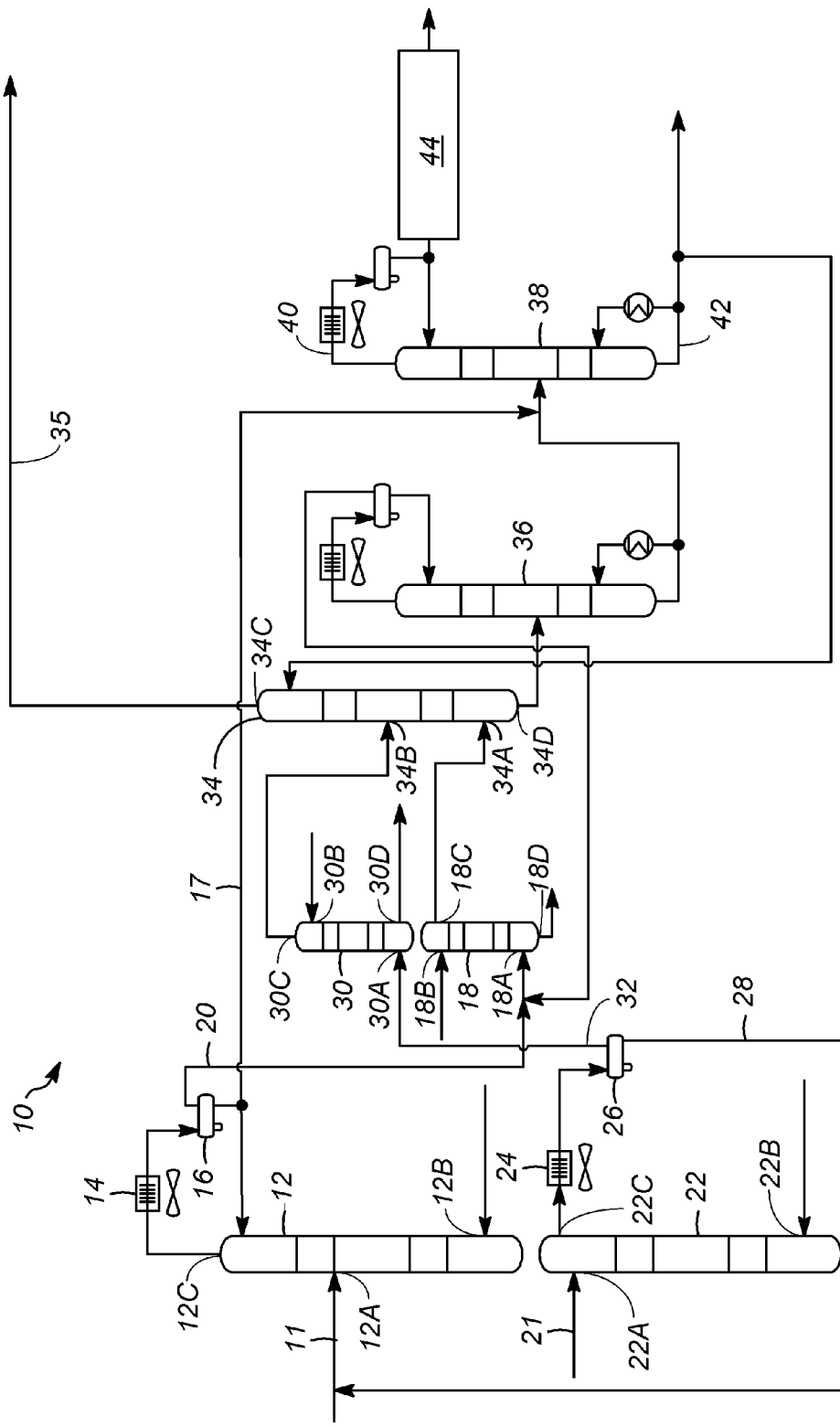
FIG. 1 is a process flow diagram showing a first process flow of the present invention.

Referring now to FIG. 1, a process flow for improving sponge absorber efficiency is generally designated 10. In the process 10, a cold flash drum liquid 11 is routed to an inlet 12A of a cold stripper 12, and medium pressure steam enters the stripper at inlet 12B. Overhead vapor rich in liquid petroleum gas is output from an outlet 12C of the cold stripper 12, and is routed to a first condenser 14 and then to a first drum 16, to cool and at least partially condense the cold stripper overhead vapor stream. The liquid portion of the condensed cold stripper overhead from the drum 16 is partially recycled to the cold stripper 12 as a reflux and net liquid is routed to the inlet of deethanizer column 36 via line 17. The cold stripper net overhead vapor from drum 16 is routed to a first amine scrubber 18 through a cold stripper net overhead vapor line 20.

Similarly, hot flash drum liquid 21 is separately routed to an inlet 22A of a hot stripper 22, and medium pressure steam enters the stripper at inlet 12B. Overhead vapor rich in hydrogen is output from an outlet 22C of the hot stripper 22, and is routed to a second condenser 24 and then to a second drum 26, to cool and at least partially condense the hot stripper overhead vapor. The liquid portion of the condensed hot stripper overhead from the drum 26 is recycled by routing the hot stripper net overhead liquid through a recycle line 28 to be mixed with the cold flash drum liquid 11 and provided as a feed to the cold stripper 12. The hot stripper net overhead vapor is separately routed to a second amine scrubber 30 through a hot stripper overhead vapor line 32.

In the first amine scrubber 18, the cold stripper net overhead vapor enters the scrubber at an inlet 18A near the bottom and flows upward, while a lean amine enters the scrubber at an inlet 18B near the top and flows downward. Preferred lean amines include alkanolamines diethanolamine (DEA), monoethanolamine (MEA), and methyldiethanolamine (MDEA). However, those of skill in the art will recognize that other amines can be used in place of or in addition to the preferred amines without departing from the scope of the invention. The lean amine contacts the cold stripper net overhead vapor, removing contaminants such as hydrogen sulfide and carbon dioxide. The resultant "sweetened" cold stripper net overhead vapor is taken out from the top of the first scrubber 18 at an outlet 18C, and a rich amine is taken out from the bottoms at an outlet 18D of the first scrubber. The rich amine may undergo regeneration to remove the hydrogen sulfide for processing to generate elemental sulfur.

In the second amine scrubber 30, the hot stripper net overhead vapor enters the scrubber at an inlet 30A near the bottom and flows upward, while a lean amine enters the scrubber at an inlet 30B near the top and flows downward. The amine provided to the second amine scrubber is preferably the same as that provided to the first amine scrubber, but those of skill in the art will recognize that different amines may be used depending on requirements of the second amine scrubber 30. As in the first scrubber 18, the lean amine entering the second amine scrubber 30 contacts the hot stripper net overhead vapor, removing contaminants such as hydrogen sulfide and carbon dioxide. The resultant "sweetened" hot stripper net overhead vapor is taken out from the top of the second scrubber 30 at an outlet 30C, and a rich amine is taken out from the bottoms at an outlet 30D. The rich amine from the second amine scrubber 30 may undergo regeneration to remove the hydrogen sulfide for processing to generate elemental sulfur.

A multi-tray sponge absorber 34 includes a first inlet 34A and a second inlet 34B to receive two distinct feeds. The first inlet 34A is provided at a tray location near a bottom of the absorber 34, while the second inlet 34B is provided near a center of the absorber. As a non-limiting example, an absorber having ten trays may have a first inlet at the tenth (i.e., bottom-most) tray, and the second inlet at the fifth tray. The sponge absorber 34 receives the sweetened cold stripper net overhead vapor from the first amine scrubber outlet 18C at the first inlet 34A, and the sweetened hot stripper net overhead vapor from the second amine scrubber outlet 30C at the second inlet 34B, higher up on the sponge absorber than the first inlet 34A. Lean sponge oil is fed into the sponge absorber 34 through a lean sponge oil line. In the sponge absorber 34, the lean sponge oil and the sweetened hot and cold stripper net overhead vapor streams are contacted in countercurrent extraction flow patterns. The sponge oil absorbs, extracts, and separates a substantial amount of methane and ethane and most of the $C_3$, $C_4$, $C_5$, and $C_6$+ light hydrocarbons (propane, butane, pentane, hexane, etc.) from the hot and cold stripper net overhead vapor streams. The sponge absorber 34 operates at a temperature of about 34 to 60° C. The effluent gases are withdrawn from the sponge absorber 34 at outlet 34C as off gas through an off gas line 35 from the top of the sponge absorber. A stream rich in LPG is extracted from the bottoms of the absorber 34 at outlet 34D Because the majority of the hydrogen present in the sponge absorber 34 is introduced as part of the hot stripper net overhead vapor, while the majority of the LPG is introduced as part of the cold stripper net overhead vapor, the LPG-rich cold stripper net overhead vapor stream is provided to the sponge absorber 34 separately from the hydrogen-rich hot stripper net overhead vapor stream, allowing the sponge oil to more easily absorb the LPG. In testing, it was found that the sponge oil requirement was reduced by approximately 34-44% to absorb a similar quantity of LPG, relative to feeding the streams to the sponge absorber together.

The LPG-rich sponge oil from the sponge absorber 34 bottoms is then routed to a deethanizer 36 and respective equipment, as is known in the art. A deethanizer overhead net vapor stream is combined with the hot stripper net overhead vapor or cold stripper net overhead vapor before the net overhead vapor stream is provided to its associated amine scrubber. The net overhead vapor stream is recycled to the associated amine scrubber to recover LPG present in the overhead. For example, as shown in FIG. 1, the deethanizer net overhead vapor stream is combined with the cold stripper net overhead vapor stream along the line 20 and introduced into the first amine scrubber 18.

A debutanizer 38 (and associated equipment) receives a feed from deethanizer 36 bottoms and separates an LPG stream 40 as a net overhead product and a light naphtha stream 42 as a bottoms product as is known in the art. The Light naphtha stream 42 from the debutanizer 38 bottoms is at least partially recycled to the sponge absorber 34 as a sponge oil and partially drawn as net bottoms product from the debutanizer. Additionally, LPG from the debutanizer 38 overhead may be further treated in a caustic treatment process 44. Because of the above-mentioned decrease in the required sponge oil circulation, there is a measurable decrease in the reboiler and condenser duty of both the deethanizer 36 and the debutanizer 38. In particular, reboiler and condenser duty requirement for both the deethanizer 36 and debutanizer 38 and their associated equipment is reduced by around 20-30% compared to the duty requirements when the hot and cold net overhead vapor streams are combined prior to entering the stripper 34.

Figure 2:
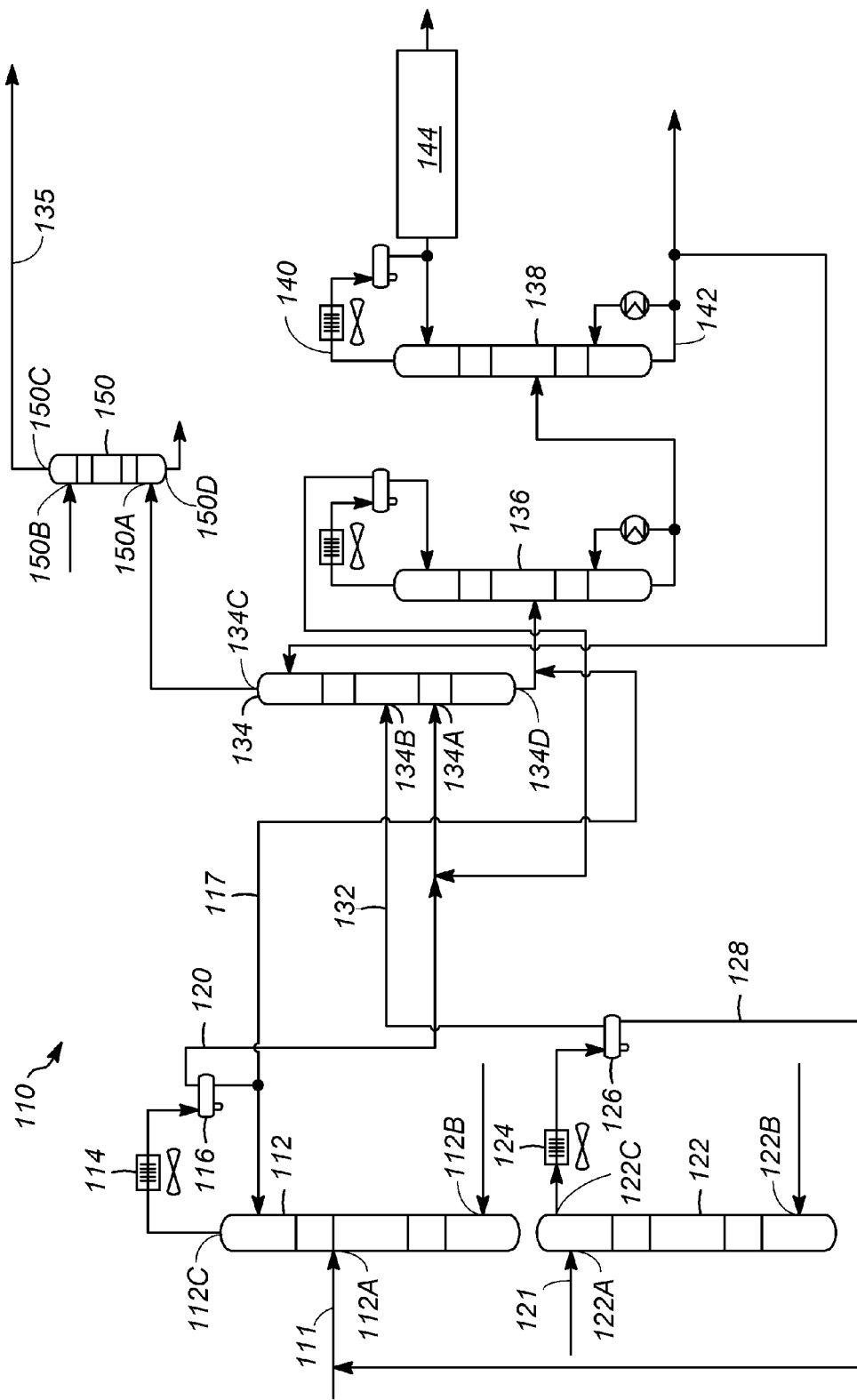
FIG. 2 is a process flow diagram showing an alternate process flow of the present invention.

Referring now to FIG. 2, a different embodiment of the process flow used to increase the efficiency of the sponge absorber is generally designated 110. The process flow 110 is consistent in many respects to other device embodiments illustrated and discussed herein including the process flow 10. For this reason, similar element numbers in the 100 series have been used for clarity.

In particular, the process flow 110 of FIG. 2 shows that a cold flash drum liquid 111 is routed to an inlet 112A of a cold stripper 112, and medium pressure steam enters the cold stripper at inlet 112B. Overhead vapor rich in liquid petroleum gas from an outlet 112C of the cold stripper 112 is routed to a first condenser 114 and then to a first drum 116, which at least partially condenses the cold stripper overhead vapor stream. The liquid portion of the condensed cold stripper overhead from the drum 116 is partially recycled to the cold stripper 112 as a reflux and net liquid is routed to the inlet of deethanizer column 136 via line 117. The cold stripper overhead vapor from drum 116 is routed directly to a first inlet 134A of the sponge absorber 134 through a cold stripper net overhead vapor line 120.

Similarly, hot flash drum liquid 121 is separately routed to an inlet 122A of a hot stripper 122, and medium pressure steam enters the hot stripper at inlet 122B. Overhead vapor rich in hydrogen from an outlet 122C of the hot stripper 122 is routed to a second condenser 124 and then to a second drum 126, to cool and at least partially condense the hot stripper overhead vapor. The liquid portion of the condensed hot stripper overhead from the drum 126 is recycled by routing the hot stripper net overhead liquid through a recycle line 128 to be mixed with the cold flash drum liquid 111 and provided as a feed to the cold stripper 112. The hot stripper net overhead vapor is separately routed directly to a second inlet 134B of the sponge absorber 134 through a hot stripper net overhead vapor line 132.

The first inlet 134A of the sponge absorber 134 is provided near a bottom of the absorber, while the second inlet 134B is provided near a center of the absorber, higher up on the sponge absorber than the first inlet 134A. As a non-limiting example, an absorber having ten trays may have a first inlet at the tenth (i.e., bottom-most) tray, and the second inlet at the fifth tray. The sponge absorber 134 receives the cold stripper net overhead vapor at the first inlet 134A, and the hot stripper net overhead vapor at the second inlet 134B, higher up on the sponge absorber. Lean sponge oil is fed into the sponge absorber 134 through a lean sponge oil line. In the sponge absorber 134, the lean sponge oil and the hot and cold stripper net overhead vapors are contacted in countercurrent extraction flow patterns. The sponge oil absorbs, extracts, and separates a substantial amount of methane and ethane and most of the $C_3$, $C_4$, $C_5$, and $C_6$+ light hydrocarbons (propane, butane, pentane, hexane, etc.) from the hot and cold stripper net overhead vapor streams. The sponge absorber 134 may operate at a temperature of about 34 to 60° C. The effluent gases (including hydrogen, methane, ethane, and hydrogen sulfide) are withdrawn from the sponge absorber 134 as off-gas at outlet 134C and are fed into an amine scrubber 150. A stream rich in LPG is extracted from the bottoms of the absorber 134 at outlet 134D.

In the amine scrubber 150, the off-gas enters the scrubber at inlet 150A near the bottom and flows upward, while a lean amine enters the scrubber at an inlet 150B near the top and flows downward. Preferred amines include alkanolamines diethanolamine (DEA), monoethanolamine (MEA), and methyldiethanolamine (MDEA). However, those of skill in the art will recognize that other amines can be used in place of or in addition to the preferred amines without departing from the scope of the invention. The lean amine contacts the off-gas, removing contaminants such as hydrogen sulfide and carbon dioxide. The resultant off-gas is taken out from an outlet 150C at the top of the scrubber 150 through off gas line 135, and a rich amine is taken out from the bottoms of the scrubber at an outlet 150D. The rich amine may undergo regeneration to remove, for example, the hydrogen sulfide for processing to generate elemental sulfur.

The LPG-rich sponge oil from the sponge absorber 134 bottoms is then routed to a deethanizer 136 and respective equipment (including a reboiler and a condenser), as is known in the art. A deethanizer overhead net vapor stream is combined with the hot stripper net overhead vapor or cold stripper net overhead vapor before the net overhead vapor stream is provided to the sponge absorber 134. The net overhead vapor stream is recycled to the sponge absorber to recover LPG present in the overhead. For example, as shown in FIG. 2, the deethanizer overhead vapor stream is combined with the cold stripper net overhead vapor stream along the line 120 and introduced into the sponge absorber 134 at the first inlet 134A.

A debutanizer 138 (and associated equipment, such as a reboiler and a condenser) receives the feed from the deethanizer 136 bottoms and separates an LPG stream 140 as a net overhead product and a light naphtha stream 142 as a bottoms product as is known in the art. The light naphtha stream 142 from the debutanizer 138 bottoms is at least partially recycled to the sponge absorber 134 as a sponge oil and partially drawn as net bottoms product from the debutanizer 138. Additionally, LPG from the debutanizer 138 overhead may be further treated in a caustic treatment process 144. Because of the above-mentioned decrease in the required sponge oil circulation, there is a measurable decrease in the reboiler and condenser duty of both the deethanizer 136 and the debutanizer 138. In particular, reboiler and condenser duty requirement for both the deethanizer 136 and debutanizer 138 and their associated equipment is reduced by around 20-30%, compared to the duty requirements when the hot and cold net overhead vapors are combined prior to entering the stripper 134.

Figure 3:
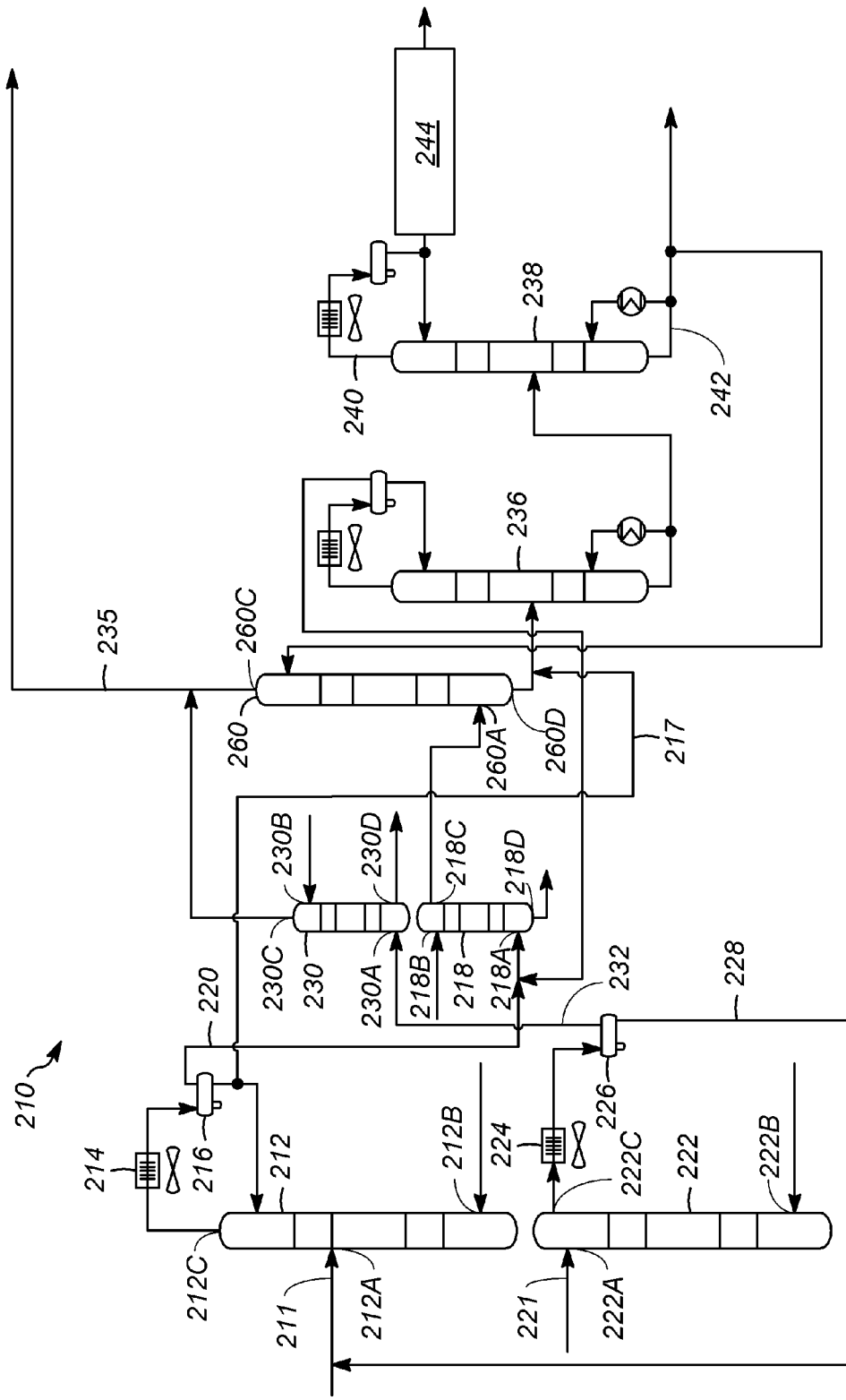
FIG. 3 is a process flow diagram showing another alternate process flow of the present invention.

Referring now to FIG. 3, another embodiment of the process flow used to increase the efficiency of the sponge absorber is generally designated 210. The process flow 210 is consistent in many respects to other device embodiments illustrated and discussed herein including the process flows 10 and 110. For this reason, similar element numbers in the 200 series have been used for clarity.

The process flow 210 of FIG. 3 shows that a cold flash drum liquid 211 is routed to an inlet 212A of a cold stripper 212, and medium pressure steam enters the cold stripper at inlet 212B. Overhead vapor rich in liquid petroleum gas from an outlet 212C of the cold stripper 212 is routed to a first condenser 214 and then to a first drum 216, which at least partially condenses the cold stripper overhead vapor stream. The liquid portion of the condensed cold stripper overhead is recycled to the cold stripper 212 as a reflux and net liquid is routed to the inlet of deethanizer column 236 via line 217. The cold stripper net overhead vapor from the drum 216 is routed to a first amine scrubber 218 through a cold stripper net overhead vapor line 220.

Hot flash drum liquid 221 is separately routed to an inlet 222A of a hot stripper 222, and medium pressure steam enters the hot stripper at inlet 222B. Overhead vapor rich in hydrogen is output from an outlet 222C of the hot stripper 222 and routed to a second condenser 224, and then to a second drum 226, to cool and at least partially condense the hot stripper overhead vapor. The liquid portion of the condensed hot stripper overhead from drum 226 is recycled by routing the hot stripper net overhead liquid through a recycle line 228 to be mixed with the cold flash drum liquid 211 and provided as a feed to the cold stripper 212. The hot stripper net overhead vapor is separately routed to a second amine scrubber 230 through a hot stripper overhead vapor line 232.

In the first amine scrubber 218, the cold stripper net overhead vapor enters the scrubber at an inlet 218A near the bottom and flows upward, while a lean amine enters the scrubber at an inlet 218B near the top and flows downward. Preferred lean amines include alkanolamines diethanolamine (DEA), monoethanolamine (MEA), and methyldiethanolamine (MDEA), but those of skill in the art will recognize that other amines can be used in place of or in addition to the preferred amines without departing from the scope of the invention. The lean amine contacts the cold stripper net overhead vapor, removing contaminants such as hydrogen sulfide and carbon dioxide. The resultant "sweetened" cold stripper net overhead vapor is taken out from the top of the first scrubber 218 at an outlet 218C, and a rich amine is taken out from the first scrubber bottoms at an outlet 218D. The rich amine may undergo regeneration to remove the hydrogen sulfide for processing to generate elemental sulfur.

In the second amine scrubber 230, the hot stripper net overhead vapor enters the scrubber at an inlet 230A near the bottom and flows upward, while a lean amine enters the scrubber at an inlet 230B near the top and flows downward. The amine provided to the second amine scrubber is preferably the same as that provided to the first amine scrubber, but those of skill in the art will recognize that different amines may be used depending on requirements of the second amine scrubber. As in the first scrubber 218, the lean amine entering the second amine scrubber 230 contacts the hot stripper net overhead vapor, removing contaminants such as hydrogen sulfide and carbon dioxide. The resultant "sweetened" hot stripper overhead vapor is taken out from a top of the second scrubber 230 at an outlet 230C, and a rich amine is taken out from the second scrubber bottoms at outlet 230D. The rich amine may undergo regeneration to remove the hydrogen sulfide for processing to generate elemental sulfur.

A multi-tray sponge absorber 260 includes an inlet 260A near a bottom of the absorber to receive the sweetened cold stripper net overhead vapor. Lean sponge oil is fed into the sponge absorber 260 through a lean sponge oil line. In the sponge absorber 260, the lean sponge oil and the sweetened cold stripper net overhead vapor are contacted in countercurrent extraction flow patterns. The sponge oil absorbs, extracts, and separates a substantial amount of methane and ethane and most of the $C_3$, $C_4$, $C_5$, and $C_6$+ light hydrocarbons (propane, butane, pentane, hexane, etc.) from the hot and cold stripper overhead vapor streams. The sponge absorber 260 may operate at a temperature of about 34 to 60° C. The effluent gases are withdrawn from the sponge absorber as off-gas through an outlet 260C, and routed through an off gas line 235, and the sweetened hot stripper net overhead vapor output from the second amine scrubber 230 is combined with the off gas. A stream rich in LPG is extracted from the bottoms of the absorber 260 at outlet 260D.

The LPG-rich sponge oil from the sponge absorber 260 bottoms is then routed to the deethanizer column 236 and respective equipment (such as a reboiler and a condenser), as is known in the art. A deethanizer overhead net vapor stream is combined with the hot stripper net overhead vapor or cold stripper net overhead vapor before the net overhead vapor stream is provided to the sponge absorber 260. The net overhead vapor stream is recycled to the sponge absorber 260 to recover LPG present in the overhead. For example, as shown in FIG. 3, the deethanizer net overhead vapor stream is combined with the cold stripper net overhead vapor stream along the line 220 and introduced into first amine scrubber 218.

A debutanizer 238 (and associated equipment, including a reboiler and a condenser) receives a feed from deethanizer 236 bottoms and separates the received feed into an LPG stream 240 as a net overhead product and a light naphtha stream 242 as a bottoms product as is known in the art. The light naphtha stream 242 from the debutanizer 238 bottoms is at least partially recycled to the sponge absorber 260 as a sponge oil and partially drawn as a net bottoms product from the debutanizer 238. Additionally, the LPG stream 240 from the debutanizer 238 overhead may be further treated in a caustic treatment process 244. Because of the above-mentioned decrease in the required sponge oil circulation, there is a measurable decrease in the reboiler and condenser duty of both the deethanizer 236 and the debutanizer 238. In particular, duty requirement for both the deethanizer 236 and debutanizer 238 and their associated equipment is reduced by around 30-40%, compared to the duty requirements when the hot and cold net overhead vapor streams are combined prior to entering the stripper 260.

This embodiment of the process flow results in a slightly less efficient LPG recovery because some LPG is lost with the hot stripper net overhead vapor. However, as noted above, a majority of the LPG is included in the cold stripper net overhead vapor. Moreover, routing the hot stripper net overhead vapor to off gas allows for even lower hydrogen content in the sponge absorber. Accordingly, the ease of sponge oil absorption is further enhanced.

While several exemplary embodiments of the process flow have been presented in the foregoing detailed description, it should be appreciated that a vast number of variations exist. It should also be appreciated that the exemplary embodiment is merely an example, and is not intended to limit the scope, applicability, or configuration of the invention in any way. Rather, the foregoing detailed description will provide those of skill in the art with a convenient road map for implementing an exemplary embodiment of the invention. It will be understood that various changes may be made in the function and arrangement of elements described in an exemplary embodiment without departing from the scope of the invention as set forth in the appended claims.

What is claimed is:

1. A sponge oil absorbing device comprising:
a cold stripper receiving a feed of cold flash drum liquid from a cold flash drum and providing, as an output, cold stripper net overhead vapor;
a hot stripper receiving a feed of hot flash drum liquid from a hot flash drum and providing, as an output, hot stripper net overhead vapor;
a sponge absorber including a first inlet and a second inlet, wherein said first inlet receives the cold stripper net overhead vapor output from said cold stripper and said second inlet receives the hot stripper net overhead vapor output from said hot stripper, and
wherein the cold stripper overhead vapor and the hot stripper overhead vapor are separately routed to said sponge absorber.

2. The sponge oil absorbing device of claim 1, wherein said first inlet is positioned at a first feed tray on said sponge absorber and said second inlet is positioned at a second feed tray above said first inlet.

3. The sponge oil absorbing device of claim 2 further comprising an amine scrubber interposed between said cold stripper and said first inlet for removing one or more impurities from the cold stripper net overhead vapor.

4. The sponge oil absorbing device of claim 2 further comprising an amine scrubber interposed between said hot stripper and said second inlet for removing one or more impurities from the hot stripper net overhead vapor.

5. The sponge oil absorbing device of claim 1, further comprising:
a condenser receiving, as an input, the hot stripper net overhead vapor, said condenser cooling and at least partially condensing the hot stripper net overhead vapor to separate a hot stripper net overhead liquid from the hot stripper net overhead vapor,
wherein the hot stripper net overhead liquid is recycled by mixing the hot stripper net overhead liquid with the cold flash drum liquid and providing to said cold stripper as an input.

6. The sponge oil absorbing device of claim 1, further comprising:
a deethanizer receiving, as an input feed, sponge absorber bottoms and producing as output a deethanized liquid petroleum gas hydrocarbon stream and an net overhead vapor stream, wherein the deethanizer net overhead vapor stream combines with one or more of the cold stripper net overhead vapor stream and the hot stripper net overhead vapor stream to form a combined net overhead vapor;
an amine scrubber receiving, as input, the combined net overhead stream; and
a de-butaniser receiving the deethanized liquid petroleum gas hydrocarbon stream and producing a liquid petroleum gas stream and a light naphtha stream.

* * * * *